United States Patent [19]

Volk

[11] Patent Number: 5,718,624
[45] Date of Patent: Feb. 17, 1998

[54] SUPPORT STRUCTURE FOR STORING POULTRY RETAINERS

[75] Inventor: Donald J. Volk, Turlock, Calif.

[73] Assignee: Volk Enterprises, Inc., Turlock, Calif.

[21] Appl. No.: 742,775

[22] Filed: Nov. 1, 1996

[51] Int. Cl.⁶ ................................................. B65D 83/00
[52] U.S. Cl. ........................ 452/176; 452/198; 206/566; 206/340
[58] Field of Search .................................. 452/176, 174, 452/198; 206/566, 561, 565, 6.1, 378, 493, 340

[56] References Cited

U.S. PATENT DOCUMENTS

| | | | |
|---|---|---|---|
| 3,040,881 | 6/1962 | McNeill | 206/493 |
| 3,061,092 | 10/1962 | Hime et al. | 206/493 |
| 4,518,083 | 5/1985 | Mayer, Jr. | 206/340 |
| 4,941,571 | 7/1990 | Barrett et al. | 206/378 |
| 5,297,985 | 3/1994 | Volk | 452/176 |
| 5,396,991 | 3/1995 | Lachambre | 206/565 |
| 5,498,201 | 3/1996 | Volk | 452/174 |

Primary Examiner—Willis Little
Attorney, Agent, or Firm—Flehr Hohbach Test Albritton & Herbert LLP

[57] ABSTRACT

A support structure for storing a plurality of retainers each used with a body of eviscerated fowl having first and second legs with respective severed extremities. Each retainer is a substantially planar thin member mountable about the severed extremities. The thin member has an outer portion which defines an opening sized to receive the legs and a plurality of protuberances which extend inwardly from the outer portion into the opening for engaging the legs. The support structure comprises an elongate member having at least one longitudinally-extending bend connecting first and second longitudinally-extending sections with first and second edges so as to be substantially V-shaped in cross-section. The cross-section of the elongate member is sized to extend through the opening in the thin member. The bend in the elongate member is adapted to engage the outer portion of the thin member between adjacent protuberances. The first and second edges are adapted to engage the outer portion of the thin member between protuberances.

21 Claims, 2 Drawing Sheets

1

SUPPORT STRUCTURE FOR STORING POULTRY RETAINERS

BACKGROUND OF THE INVENTION

1. Field of the Invention

This invention relates in general to retainers for use in trussing fowl and pertains, more specifically, to support structures for the storing and packaging of such retainers.

2. Prior Art

Retainers and devices have been provided for trussing eviscerated fowl. For example, U.S. Pat. No. 5,498,201 discloses a retainer for mounting about the legs of chicken and other fowl to secure the legs close to the body during shipping and cooking. There is a need, however, for a support structure for packaging and shipping these retainers.

Accordingly, a primary object of the present invention is to provide a support structure for storing a plurality of retainers for trussing eviscerated fowl or poultry.

Another object of the invention is to provide a support structure of the above character for storing the retainers in a nested relationship.

Another object of the invention is to provide a support structure of the above character from which the retainers can be easily dispensed.

Another object of the invention is to provide a packaged structure for shipping a plurality of such support structures.

SUMMARY OF THE INVENTION

In general, the invention consists of a support structure for storing a plurality of retainers each used with a body of eviscerated fowl having first and second legs with respective severed extremities. Each retainer is a substantially planar thin member mountable about the severed extremities. The thin member has an outer portion which defines an opening sized to receive the legs and a plurality of protuberances which extend inwardly from the outer portion into the opening for engaging the legs. The support structure comprises an elongate member having at least one longitudinally-extending bend connecting first and second longitudinally-extending sections with first and second edges so as to be substantially V-shaped in cross-section. The cross-section of the elongate member is sized to extend through the opening in the thin member. The bend in the elongate member is adapted to engage the outer portion of the thin member between adjacent protuberances. The first and second edges are adapted to engage the outer portion of the thin member between protuberances.

BRIEF DESCRIPTION OF THE DRAWINGS

The accompanying drawings, which are incorporated in and form a part of this specification, illustrate an embodiment of the invention and, together with the description, serve to explain the principles of the invention.

DETAILED DESCRIPTION OF THE PREFERRED EMBODIMENTS

Figure 1:
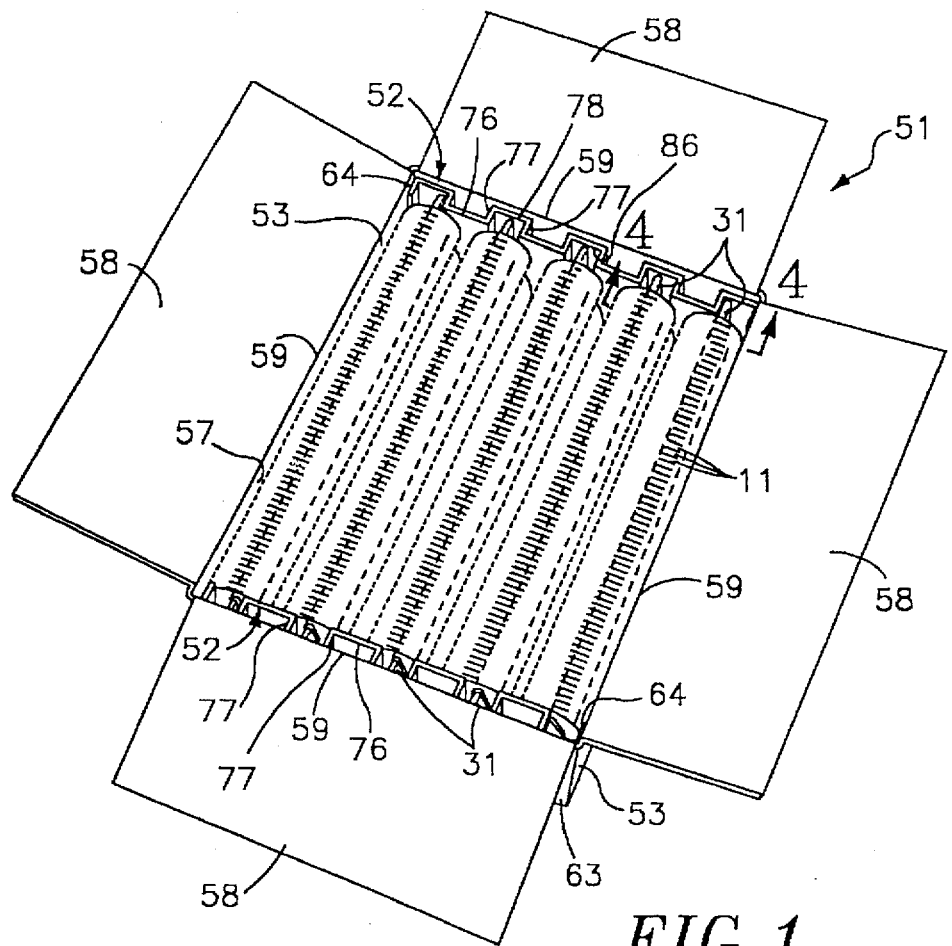
FIG. 1 is a perspective view of a plurality of the support structures,of the present invention arranged in a packaged structure of the present invention.

Reference will now be made in detail to a preferred embodiment of the invention. While the invention will be described in conjunction with this preferred embodiment, it will be understood that the invention is not limited to this embodiment. On the contrary, the invention is intended to cover alternatives, modifications and equivalents which may be included within the spirit and scope of the invention as defined by the appended claims.

Turning now to the drawings, wherein like components are designated by like reference numerals throughout the various figures, attention is directed to FIGS. 1 through 6.

A poultry leg truss or retainer 11 for use with the present invention is adapted for use with a carcass or body of eviscerated poultry such as a chicken having drumsticks or legs with exposed severed extremities in the form of knuckles or hocks. The retainer 11, as more fully described in U.S. Pat. No. 5,498,201 and illustrated in general in FIGS. 2 and 3, includes a unitary substantially planar thin plastic member 12 which mounts about the legs and hocks of the eviscerated fowl. Thin member 12 is injection molded out of nylon or made from any other suitable material and includes an outer or ring-like peripheral portion in the form of closed ring 13. More specifically, the oblong-shaped ring 13 is formed from a first or upper elongate portion 16 and a second or lower elongate portion 17 extending in generally parallel directions and a first or left end portion 18 and a second or right end portion 19 joining the respective ends of elongate portions 16 and 17. Each of the elongate portions 16 and 17 has a generally straight inner surface 22 and an opposite convex outer surface 23 which arcs slightly outwardly at the center thereof. Arcuately-extending end portions 18 and 19 have a substantially constant width of approximately 0.25 inch and elongate portions 16 and 17 have a width at their widest or central point of approximately 0.3 inch. Portions 16–19 of the relatively rigid ring 13 each have a thickness of approximately 0.06 inch.

Figure 2:
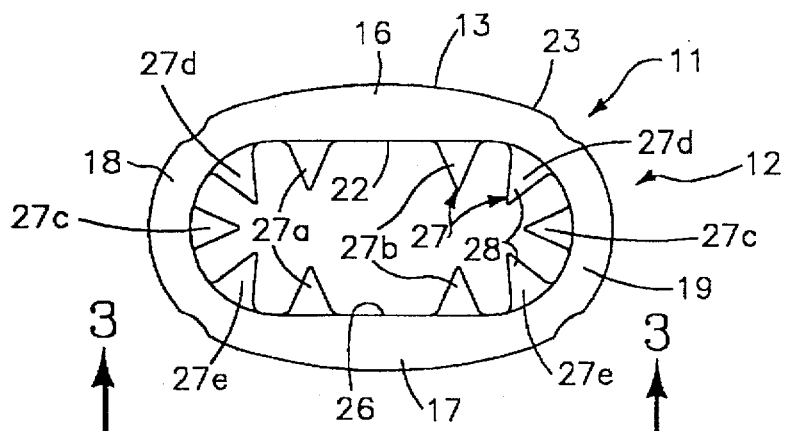
FIG. 2 is a top plan view of a retainer for use with the support structure of the present invention.
Figure 3:
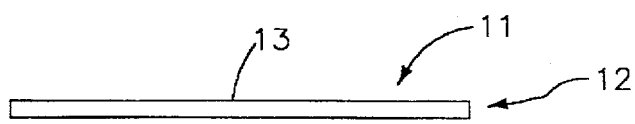
FIG. 3 is a side elevational view of the retainer of FIG. 2 taken along the line 3—3 of FIG. 2.

Thin member 12 has a central opening 26 defined by ring 13 (see FIG. 2). Central opening 26 is elongated and has a ratio of length to width of at least two to one. More specifically, opening 26 has a length of approximately 2.2 inches at its widest point from the inside centers of generally semi-circular end portions 18 and 19 and a width of approximately one inch between opposite inner surfaces 22 of elongate portions 16 and 17.

Retainer 11 is provided with a plurality of spaced-apart protuberances or prong portions 27 formed integral with ring 13 and extending inwardly into central opening 26 at approximately right angles from the ring. Each of the prong portions or prongs has a thickness of approximately 0.015 inch which is less than the thickness of outer ring 13. Each prong 27 has the general shape of an isosceles triangle and has first and second sides which taper inwardly at a relative angle of approximately 45° toward a rounded inner end portion or extremity 28.

As illustrated in FIG. 2, each retainer 11 is formed with ten prongs 27. A first opposed pair of prongs 27a are formed at the left ends of elongate portions 16 and 17 adjacent left end portion 18. A second opposed pair of prongs 27b is similarly formed at the right ends of elongate portions 16 and 17 adjacent right end portion 19. First and second opposed pairs of prongs 27a and 27b extend in directions generally parallel to each other. A third or central opposed pair of prongs 27c is formed at the respective centers of end portions 18 and 19 and, as so disposed, are aligned at right angles to first and second prongs 27a and 27b. Each of the end portions 18 and 19 further includes fourth and fifth prongs 27d and 27e which extend radially inwardly from the end portions at right angles to each other. The fourth prong 27d in each of the end portions 18 and 19 is spaced equidistantly between the upper first prong 27a or second prong 27b and the central prong 27c, while the fifth prong 27e in each of the end portions 18 and 19 is spaced equidistantly between the central prong 27c and the bottom first prong 27a or second prong 27b. As such, the five prongs 27a–27e are spaced apart at approximately equal 45° intervals over the full 180° of each of the end portions 18 and 19 of thin member 12.

Figure 4:
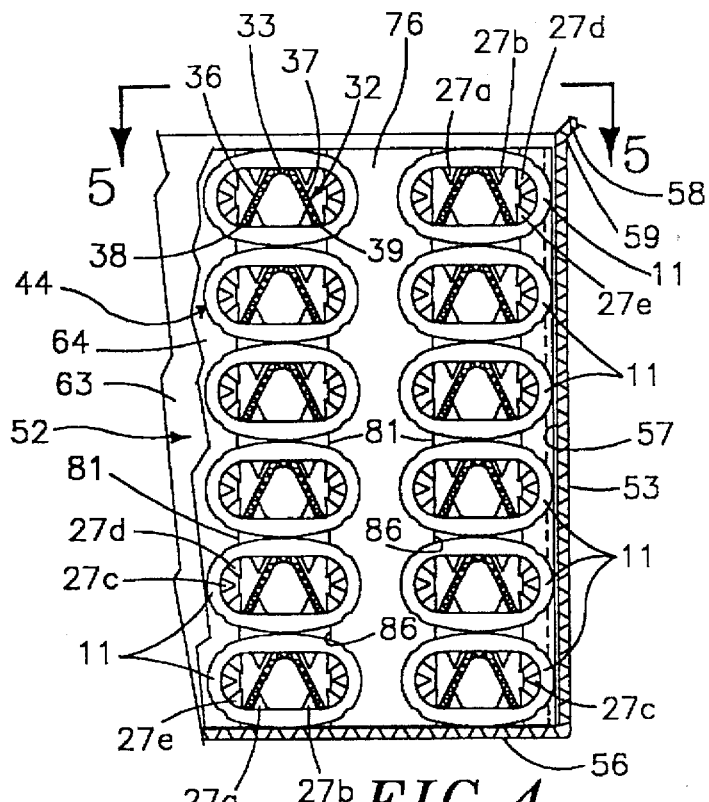
FIG. 4 is a cross-sectional view of the packaged structure of FIG. 1 taken along the line 4—4 of FIG. 1.
Figure 5:
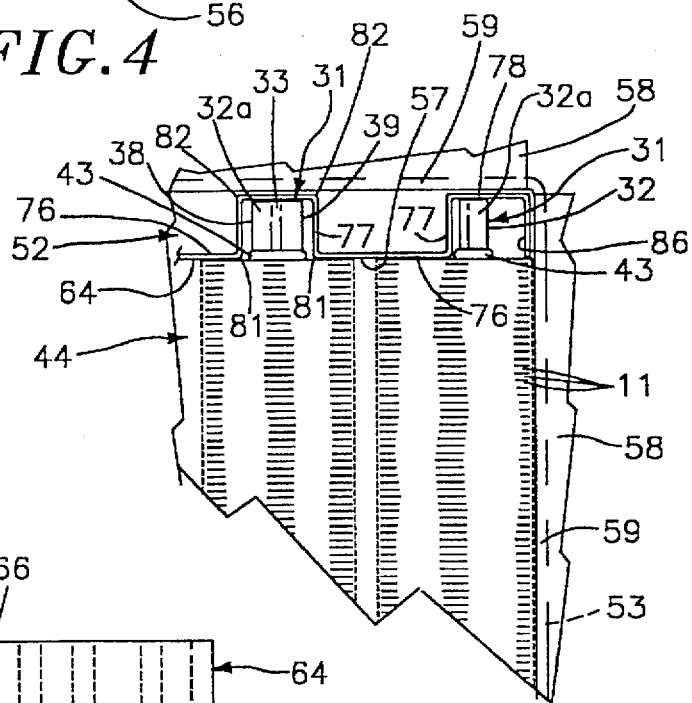
FIG. 5 is an enlarged top plan view of the packaged structure of FIG. 1 taken along the line 5—5 of FIG. 4.

Support structure or runner 31 of the present invention comprises an elongate member 32 made from any suitable material such as a unitary piece of cardboard (see FIGS. 1, 4 and 5). The elongate member has first and second opposite ends 32a and a length from end to end of approximately 20 inches. The elongate member 32 is bent along the longitudinal center thereof so as to be provided with at least one longitudinally-extending bend 33 extending between ends 32a. Bend 33 connects first and second longitudinally-extending sections 36 and 37 provided with respective first and second edges 38 and 39 opposite bend 33. Each of sections 36 and 37 is generally planar. Edges 38 and 39 extend in directions generally parallel to each other and to bend 33. As such, each of sections 36 and 37 has a rectangular shape with a width between bend 33 and respective edge 38 or 39 of approximately 1.25 inch. Sections 36 and 37 are disposed at an acute dihedral angle which approximates 90° relative to each other. Thus, elongate member 32 has a substantially V-shaped cross section as shown in FIG. 4.

Elongate member 32 has a cross-sectional profile sized to permit runner 31 to extend through central opening 26 of a retainer 11. Thus, a plurality of juxtaposed retainers 11 can be slidably disposed on runner 31 in a nested relationship for storage and shipping (see FIGS. 1, 4 and 5). Bend 33 in elongate member 32 opposes and, more specifically, engages inner surface 22 of upper elongate portion 16 between first and second prongs 27a and 27b. First edge 38 opposes and, more specifically, engages inner surface 22 of lower elongate portion 17 between first prong 27a and fifth prong 27e. Similarly, second edge 39 engages inner surface 22 of lower elongate portion 17 between second prong 27b and fifth prong 27e. As can be appreciated, sidewise movement of thin members 12 relative to elongate member 32 is inhibited by the engagement of first and second sections 36 and 37 with the adjacent prongs 27 of the thin members. In this manner, bend 33 and edges 38 and 39 serve to align the plurality of retainers 11 on runner 31.

A removable means in the form of rubber band 43 is mounted on each exposed end 32a of elongate member 32 to secure the retainers 11 to runner 31. The plurality of retainers 11 so mounted on runner 31 form an assembly 44.

A plurality of assemblies 44 can be packaged together in a structure which includes a suitable container such as cardboard carton 51. The conventional carton 51 is formed by first and second spaced-apart parallel end walls 52 and first and second spaced-apart parallel adjoining side walls 53 extending perpendicularly between the respective walls 52 (see FIGS. 1, 4 and 5). A planar bottom wall 56 extends perpendicularly between the bottom of planar walls 52 and 53 to form a support surface within carton 51. Walls 52, 53 and 56 serve to form an internal cavity 57. A flap 58 adjoins the top of each wall 52 and 53 at a bend 59 for permitting closure of carton 51 in a conventional manner. As so formed, carton 51 has the shape of a parallelepiped.

Figure 6:
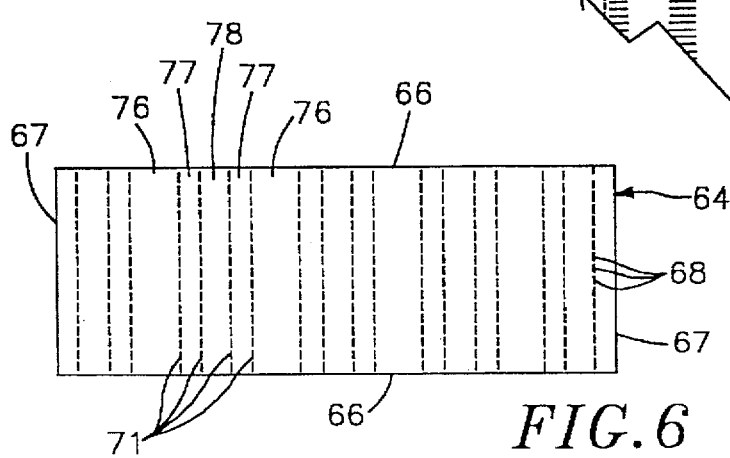
FIG. 6 is a side plan view of a portion of the packaged structure of FIG. 1.

Each of first and second end walls 52 includes an outer wall 63 secured at each end to the adjacent side wall 53 and at the bottom to bottom wall 56 and a removable inner wall in the form of a sheet 64 made from any suitable material such as cardboard. As illustrated in FIG. 6, cardboard member or sheet 64 is rectangular in shape with top and bottom edges 66 and left and right edges 67. The sheet 64 is provided with a plurality of perforations 68 extending perpendicularly between edges 66 so as to form a plurality of parallel perforated elongate lines 71 for facilitating bending of the sheet thereat. Lines 71 are spaced apart between edges 67 to form a repeating pattern of rectangular-shaped sections consisting of a spacer section 76, a side section 77, a rear section 78 and another side section 77. As illustrated in FIGS. 1 and 5, sheet 64 is bent at two of lines 71 to form bends 81 and cause the two side sections 77 of each pattern to extend rearwardly at respective right angles to the spaced-apart spacer sections 76. The two side sections 77 adjoin rear section 78 at rear bends 82. The rear section 78 extends in a plane generally parallel to the plane containing spacer sections 76. As such, at least one and more specifically a plurality of vertical slots 86 extending perpendicularly of bottom wall 56 are formed by sheet 64 in each of end walls 52. The opening of each slot 86 is defined by spaced-apart bends 81. Each of parallel slots 86, when viewed from the top as in FIG. 5, has a generally rectangular shape formed by left and right spaced-apart side sections 77 and rear section 78 extending therebetween.

Slots 86 are sized so as to slidably receive the exposed ends 32a of a runner 31. The slots 86 formed in each end wall 52 are aligned so that the runner 31 extends perpendicularly between the end walls. Thus, a plurality and as shown five assemblies 44 can be placed side-by-side within cavity 57. The distance between the rear section 78 of opposed slots 86 is dimensioned slightly larger than the length of elongate member 32 and the transverse dimension of each slot 86 is slightly larger than the distance between the first and second edges 38 and 39 of elongate member 32 so as to inhibit undesirable shifting of assemblies 44 during transport or other movement of carton 51. End walls 52 and slots 86 formed therein are vertically sized so that a plurality and as shown six assemblies 44 can be stacked atop each other within cavity 57.

Following shipping of retainers 11 on runners 31 packaged within carton 51, the retainers can be dispensed from the runner 31 and mounted about the legs of eviscerated fowl as more specifically described in U.S. Pat. No. 5,498,201. In this regard, the severed extremities of the legs of a fowl extend through retainer central opening 26. In this manner, the retainer 11 serves to secure the legs closely against the body of the eviscerated fowl during cooking.

Although runner 31 and carton 51 have been described for use with retainers 11, it should be appreciated that other poultry trussing retainers can be used with runner 31 and carton 51 and be within the scope of the present invention. Similarly, it should be appreciated that runners having other cross-sectional shapes and sizes can be provided for storing retainers and be within the scope of the present invention.

It is apparent from the foregoing that a support structure for storing a plurality of retainers for trussing eviscerated fowl or poultry has been provided. The support structure serves to store the retainers in a nested relationship and permits the retainers to be easily dispensed for mounting on the fowl or poultry. A plurality of support structures with retainers thereon can be assembled in a packaged structure for shipping.

The foregoing description of a specific embodiment of the present invention has been presented for purposes of illustration and description. It is not intended to be exhaustive or to limit the invention to the precise forms disclosed, and obviously many modifications and variations are possible in light of the above teachings. The embodiment was chosen and described in order to best explain the principles of the invention and its practical application, and to thereby enable others skilled in the art to best utilize the invention and embodiment with various modifications as are suited to the particular use contemplated. It is intended that the scope of the invention be defined by the Claims appended hereto and their equivalents.

What is claimed is:

1. A support structure for storing a plurality of retainers each used with a body of eviscerated fowl having first and second legs with respective severed extremities, each retainer being a substantially planar thin member mountable about the severed extremities and having an outer portion which defines an opening sized to receive the legs and a plurality of protuberances which extend inwardly from the outer portion into the opening for engaging the legs, the support structure comprising an elongate member having an end and at least one longitudinally-extending bend connecting first and second longitudinally-extending sections with first and second edges so as to be substantially V-shaped in cross-section, the cross-section of the elongate member being sized to extend through the opening in the thin member, the bend in the elongate member being adapted to engage the outer portion of the thin member between adjacent protuberances and the first and second edges being adapted to engage the outer portion of the thin member between protuberances, the end having means extending sidewise of the elongate member for keeping the plurality of retainers on the elongate member.

2. A support structure as in claim 1 wherein the first and second sections of the elongate member are disposed at an angle of approximately 90° relative to each other.

3. A support structure as in claim 1 wherein the first and second sections of the elongate member are disposed at an acute angle relative to each other.

4. A support structure as in claim 1 wherein the elongate member is formed from a unitary piece of cardboard.

5. A support structure as in claim 1 wherein the means for keeping the plurality of retainers on the elongate member is removably mounted on the end of the elongate member.

6. A support structure as in claim 5 wherein the means for keeping the plurality of retainers on the elongate member is a rubber band.

7. An assembly comprising a support structure formed from an elongate member having first and second longitudinally-extending sections joined at a longitudinally-extending bend, the first and second sections terminating at first and second edges extending in directions parallel to the bend, a plurality of retainers adapted for use with a body of eviscerated fowl having legs with severed extremities, each retainer formed from a thin plastic member having an outer portion which defines an elongate central opening sized to receive the legs, a plurality of spaced-apart protuberances formed integral with the outer portion and extending inwardly into the opening for engaging the legs when the plastic member is mounted about the severed extremities, the elongate member being cross-sectionally sized to permit the elongate member to extend through the opening in the plastic members, the bend in the elongate member opposing the outer portion of each plastic member between adjacent protuberances and the first and second edges opposing the outer portion of each plastic member adjacent respective protuberances.

8. An assembly as in claim 7 wherein the outer portion of the plastic member is closed.

9. An assembly as in claim 7 wherein the plastic member is oblong in shape.

10. An assembly as in claim 9 wherein the outer portion has first and second spaced-apart semicircular end portions joined together by first and second spaced-apart elongate portions.

11. A packaged structure comprising a plurality of retainers adapted for use with a body of eviscerated fowl having first and second legs with respective severed extremities, each retainer being a thin plastic member which mounts about the severed extremities and has an outer portion defining a central opening sized to receive the legs when the plastic member is mounted about the severed extremities, an elongate support member having opposite first and second ends, the support member extending through the central openings of the plastic members so that the retainers are aligned in juxtaposition on the support member, a container having an internal cavity formed by first and second spaced-apart parallel end walls and first and second spaced-apart parallel side walls extending perpendicularly between the end walls and a bottom wall extending perpendicularly between the end walls and side walls, the end walls each formed with at least one slot therein for receiving the ends of the support member.

12. A package as in claim 11 wherein the support member has a substantially V-shaped cross-section.

13. A package as in claim 11 together with removable means mounted on the ends of the support member for retaining the retainers on the support member.

14. A package as in claim 11 wherein the slot extends perpendicularly of the bottom wall and the support member extends perpendicularly between the end walls.

15. A package as in claim 11 together with an additional support member of the same type as the first-named support member and an additional plurality of retainers of the same type as the first-named retainers aligned in juxtaposition on the additional support member, the ends of the additional support member being disposed in the slots atop the ends of the first-named support member.

16. A package as in claim 11 together with an additional support member of the same type as the first-named support member and an additional plurality of retainers of the same type as the first-named retainers aligned in juxtaposition on the additional support member, the end walls each being formed with an additional slot extending parallel to the first named slot for receiving the ends of the additional support member.

17. A package as in claim 11 wherein the container comprises a cardboard box and the end walls include a cardboard member bent to form the slot.

18. A package as in claim 17 wherein the cardboard member has a plurality of elongate parallel bends for creating sections to form the slot.

19. A package as in claim 17 wherein the cardboard member has a plurality of spaced-apart slots and a portion extending in a plane, each slot being formed from two elongate sections extending from two parallel bends disposed in the plane and an additional elongate section extending between the first-named sections at two parallel bends disposed in an additional plane which is substantially parallel to the first-named plane.

20. A support structure for storing a plurality of retainers each used with a body of eviscerated fowl having first and second legs with respective severed extremities, each retainer being a substantially planar thin member mountable about the severed extremities and having an outer portion which defines an opening sized to receive the legs and a plurality of protuberances which extend inwardly from the outer portion into the opening for engaging the legs, the support structure comprising an elongate member having an end and at least one longitudinally-extending bend connecting first and second longitudinally-extending sections with first and second edges so as to be substantially V-shaped in cross-section, the cross-section of the elongate member being sized to extend through the opening in the thin member, the end having means extending sidewise of the elongate member for keeping the plurality of retainers on the elongate member.

21. A support structure as in claim 20 wherein the elongate member is formed from a unitary piece of cardboard.

* * * * *